(12) United States Patent
Bi et al.

(10) Patent No.: US 10,680,881 B2
(45) Date of Patent: *Jun. 9, 2020

(54) SYSTEM AND METHOD OF RADIO BEARER MANAGEMENT FOR MULTIPLE POINT TRANSMISSION

(71) Applicant: Futurewei Technologies, Inc., Plano, TX (US)

(72) Inventors: Hao Bi, Lake Zurich, IL (US); Yishen Sun, Buffalo Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,537

(22) Filed: Apr. 6, 2015

(65) Prior Publication Data

US 2015/0215162 A1 Jul. 30, 2015

Related U.S. Application Data

(63) Continuation of application No. 13/329,197, filed on Dec. 16, 2011, now Pat. No. 9,276,810.

(51) Int. Cl.
*H04L 12/24* (2006.01)
*H04W 28/02* (2009.01)
(Continued)

(52) U.S. Cl.
CPC ......... *H04L 41/0803* (2013.01); *H04B 7/024* (2013.01); *H04J 11/0053* (2013.01);
(Continued)

(58) Field of Classification Search
CPC ......... H04L 45/02; H04L 41/12; H04L 45/00; H04L 45/04; H04L 43/12; H04W 16/00;
(Continued)

(56) References Cited

U.S. PATENT DOCUMENTS 6,459,901 B1 * 10/2002 Chawla ................ H04W 72/04
370/341
8,050,656 B2 * 11/2011 Narasimha ............ H04W 36/14
370/331
(Continued)

FOREIGN PATENT DOCUMENTS

CN 1805591 A 7/2006
CN 101426256 A 5/2009
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access, (Release 10)," 3GPP TS 23.401, V10.0.0, Jun. 2010, 261 pages.

(Continued)

*Primary Examiner* — Warner Wong
(74) *Attorney, Agent, or Firm* — Slater Matsil, LLP

(57) ABSTRACT

A method for operating a multiple point transmission system is disclosed. The method includes reconfiguring the multiple point transmission system according to an updated configuration of an at least one radio bearer between an at least one transmission point and a terminal device, and communicating with the terminal device using the reconfigured multiple point transmission system. The configuration of the at least one radio bearer is updated according to operating condition information of the terminal device.

34 Claims, 7 Drawing Sheets

(51) Int. Cl.
| | |
|---|---|
| *H04B 7/024* | (2017.01) |
| *H04J 11/00* | (2006.01) |
| *H04W 76/15* | (2018.01) |
| *H04W 76/11* | (2018.01) |
| *H04L 29/08* | (2006.01) |
| *H04W 72/04* | (2009.01) |
| *H04W 72/00* | (2009.01) |

(52) U.S. Cl.
CPC ....... *H04L 67/322* (2013.01); *H04W 28/0252* (2013.01); *H04W 72/04* (2013.01); *H04W 76/11* (2018.02); *H04W 76/15* (2018.02); *H04W 72/00* (2013.01)

(58) Field of Classification Search
CPC . H04W 28/00; H04W 28/0252; H04W 72/02; H04W 72/04; H04W 72/0453
See application file for complete search history.

(56) References Cited

U.S. PATENT DOCUMENTS

| | | | | |
|---|---|---|---|---|
| 8,160,611 | B1* | 4/2012 | Oroskar | H04W 48/04 455/403 |
| 8,447,318 | B1* | 5/2013 | Oroskar | H04W 76/025 370/329 |
| 8,515,441 | B1* | 8/2013 | Oroskar | H04W 72/042 370/394 |
| 9,270,346 | B2* | 2/2016 | Ahmadi | H04B 7/024 |
| 9,301,305 | B2* | 3/2016 | Picker | H04W 72/0453 |
| 2002/0067707 | A1* | 6/2002 | Morales | H04W 36/0066 370/331 |
| 2004/0203783 | A1* | 10/2004 | Wu | H04L 63/062 455/436 |
| 2005/0154895 | A1* | 7/2005 | Zhang | H04L 63/06 713/182 |
| 2006/0034461 | A1* | 2/2006 | Park | H04L 9/083 380/277 |
| 2006/0178131 | A1* | 8/2006 | Huotari | H04L 63/062 455/410 |
| 2007/0070935 | A1* | 3/2007 | Prakash | H04L 63/102 370/328 |
| 2007/0238463 | A1 | 10/2007 | Ogami | |
| 2008/0037468 | A1 | 2/2008 | Zisimopoulos et al. | |
| 2009/0232095 | A1* | 9/2009 | Ahn | H04W 74/006 370/331 |
| 2010/0080172 | A1 | 4/2010 | Jin et al. | |
| 2010/0285792 | A1* | 11/2010 | Chen | H04W 72/005 455/422.1 |
| 2010/0291936 | A1 | 11/2010 | Zangi et al. | |
| 2010/0303039 | A1* | 12/2010 | Zhang | H04L 5/0035 370/331 |
| 2010/0317345 | A1* | 12/2010 | Futaki | H04W 36/0055 455/436 |
| 2011/0007685 | A1 | 1/2011 | Ma et al. | |
| 2011/0188393 | A1 | 8/2011 | Mallik et al. | |
| 2011/0230180 | A1* | 9/2011 | Akiyama | H04W 16/00 455/422.1 |
| 2011/0237272 | A1 | 9/2011 | Gorokhov et al. | |
| 2011/0243063 | A1* | 10/2011 | Kuningas | H04W 28/16 370/328 |
| 2011/0281585 | A1* | 11/2011 | Kwon | H04L 1/0002 455/436 |
| 2012/0079559 | A1 | 3/2012 | Reznik et al. | |
| 2012/0252462 | A1* | 10/2012 | Fahldieck | H04W 36/32 455/438 |
| 2012/0281563 | A1* | 11/2012 | Comsa | H04W 24/10 370/252 |
| 2013/0016671 | A1 | 1/2013 | Cheng et al. | |
| 2013/0044707 | A1 | 2/2013 | Chen | |
| 2013/0077578 | A1 | 3/2013 | Wang et al. | |
| 2013/0148600 | A1 | 6/2013 | Moulsley et al. | |
| 2014/0036849 | A1* | 2/2014 | Ribeiro | H04W 72/042 370/329 |
| 2014/0056128 | A1 | 2/2014 | Racz et al. | |
| 2014/0078934 | A1 | 3/2014 | Hugl et al. | |
| 2014/0219248 | A1 | 8/2014 | Reddiboyana et al. | |
| 2014/0254532 | A1* | 9/2014 | Ryu | H04B 7/024 370/329 |

FOREIGN PATENT DOCUMENTS

| | | |
|---|---|---|
| CN | 101998651 A | 3/2011 |
| CN | 102026398 A | 4/2011 |
| EP | 1971174 A2 | 3/2007 |
| WO | 2010002297 A1 | 1/2010 |
| WO | 2010026452 A2 | 3/2010 |

OTHER PUBLICATIONS

3rd Generation Partnership Project; Technical Specification Group Radio Access Network; Radio Resource Control (RRC); Protocol Specification (Release 10), 3GPP TS 25.331, V10.4.0, Jun. 2011, 1,879 pages.

"3rd Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2 (Release 10)," 3GPP TS 36.300, V10.4.0, Jun. 2011, 194 pages.

"3rd Generation Partnership Project; Technical Specification Group Radio Access Network; Evolved Universal Terrestrial Radio Access (E-UTRA) Radio Resource Control (RRC); Protocol Specification (Release 10)," 3GPP TS 36.331, V10.2.0, Jun. 2011, 294 pages.

"Upper Layer (Layer 3) Signaling Standard for cdma2000 Spread Spectrum Systems," 3rd Generation Partnership Project 2, 3GPP2 C.S0005-E, Version 3.0, Jun. 2011, 2,386 pages.

"Information technology—Telecommunications and information exchange between systems—Local and metropolitan area networks—Specific requirements—Part 11: Wireless LAN Medium Access Control (MAC) and Physical Layer (PHY) Specifications," ANSI/IEEE Std. 802.11, LAN MAN Standards Committee of the IEEE Computer Society, 1999, 528 pages.

International Search Report and Written Opinion of Patent Cooperation Treaty (PCT), International Application No. PCT/CN2012/078663, Applicant Huawei Technologies Co., Ltd., et al., 13 pages.

* cited by examiner

SYSTEM AND METHOD OF RADIO BEARER MANAGEMENT FOR MULTIPLE POINT TRANSMISSION

This application is a continuation of U.S. patent application Ser. No. 13/329,197, entitled "System and Method of Radio Bearer Management for Multiple Point Transmission," filed on Dec. 16, 2011, which application is hereby incorporated herein by reference.

TECHNICAL FIELD

The present invention relates to a system and method for setting up radio bearers in a wireless communication, and more particularly to a system and method for multiple point transmission in a wireless communications system.

BACKGROUND

Wireless communication systems have become an important means by which many people worldwide have come to communicate. A wireless communication system interconnects many nodes by using electromagnetic waves, such as radio waves, rather than wires commonly used in a fixed telephone network system. A wireless communication system often consists of many mobile devices and a plurality of base stations. A base station serves a mobile device when it enters a region associated with the base station.

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of standards such as the main $2^{nd}$-Generation (2G) technology Global System for Mobile Communications (GSM), the main $3^{rd}$-Generation (3G) technology Universal Mobile Telecommunications System (UMTS) and the main $4^{th}$-Generation (4G) technology Long Term Evolution (LTE).

As technologies evolve, multiple input, multiple output (MIMO) systems are employed to achieve better channel utilization and overall performance. In particular, MIMO systems are communication systems having multiple transmission and multiple reception antennas at both enhanced Node B (eNB) (or base station (BS), Node B (NB, and so forth) and user equipment (UE) (or mobile station (MS), terminal, terminal device, user, subscriber, subscriber equipment and so on). In a MIMO system, a transmitter may transmit a multiple user MIMO signals to a plurality of receivers. Each of the MIMO signals may be pre-coded with a corresponding pre-coding scheme. In addition, the MIMO signals may be spatially multiplexed and transmitted in the same time-frequency slot.

An extension to MIMO makes use of multiple transmission points (each of which may be a set of geographically co-located transmit antennas) to transmit to a single UE or a group of UEs. The transmissions from the multiple transmission points may occur at different times and/or at different frequencies so that the UE (or the group of UEs) will receive transmissions from all of the multiple transmission points over a time window. This operating mode may often be referred to as multiple point transmission. As an example, at a first time, a first transmission point may be employed to transmit data to a UE, at a second time, a second transmission point may be employed to transmit data to the UE, and so on.

Coordinated multiple point (CoMP) transmission is one form of multiple point transmission, wherein the transmission made by the multiple transmission points are coordinated so that the UE or the group of UE may be able to either combine the transmissions made by the multiple transmission points or avoid interference to improve overall performance. A transmission point may be an eNB, a part of an eNB, a remote radio head coupled to an eNB and the like. When the UE transmits data to an eNB, a CoMP based reception means the transmitted data from the UE will be received by a plurality of geographically separated eNBs. On the other hand, when the UE receives data, the data to the UE may be instantaneously transmitted from a plurality of transmission points.

As an extension to multiple point transmission systems, coordinated multiple point (CoMP) transmission and reception is adopted for Long Term Evolution Advanced (LTE-A) to further improve channel utilization and overall performance. CoMP helps to enable the dynamic coordination of transmission and reception of a plurality of base stations. More particularly, when a mobile station is located at an overlapped region loosely covered by a plurality of base stations, CoMP helps to coordinate the base stations so that the base stations are able to jointly transmit user data to the mobile station. In addition, through a dynamic base station selection scheme, CoMP helps to find a base station and enable the base station to transmit user data to the mobile station. In order to better coordinate a plurality of base stations serving a mobile station, the channel property feedback information such as channel status information from mobile stations to a network entity is required.

CoMP transmission has been considered as a fundamental element for the next generation wireless communications systems. For example, in Third Generation Partnership Project (3GPP) Long Term Evolution Advanced standards compliant communications systems, CoMP transmission is an effective tool to improve the coverage of high data rates, cell-edge throughput, and/or to increase overall communications system throughput in both high load and low load scenarios. As such, by employing CoMP, a LTE-A system may achieve better coverage and capacity.

SUMMARY OF THE INVENTION

These technical advantages are generally achieved by the present invention which provides a system and method for managing radio bearers in a multiple point transmission system.

In accordance with an embodiment, a method includes reconfiguring the multiple point transmission system according to an updated configuration of an at least one radio bearer between an at least one transmission point and a terminal device, and communicating with the terminal device using the reconfigured multiple point transmission system. The configuration of the at least one radio bearer is updated according to operating condition information of the terminal device.

In accordance with another embodiment, a system comprises a primary point and an at least one secondary point. The at least one of the primary point and the at least one secondary point is configured to reconfigure the multiple point transmission system according to an updated configuration of an at least one radio bearer between an at least one transmission point and a terminal device, and communicate with the terminal device using the reconfigured multiple point transmission system. The configuration of the at least one radio bearer is updated according to an operating condition information of the terminal device.

In accordance with another embodiment, a primary point for operating a multiple point transmission system is disclosed. The primary point includes a processor and a transceiver. The processor is configured to determine that a reconfiguration is needed for the multiple point transmission system. The reconfiguration is in accordance with an updated configuration of an at least one radio bearer between at least one transmission point and a terminal device and the configuration is updated according to operating condition information of the terminal device. The transceiver is configured to inform a terminal device by sending a first message regarding the reconfiguration.

In accordance with another embodiment, a multiple point transmission system is disclosed. The multiple point transmission system includes a primary point and at least one secondary point. The primary point is configured to communicate with a terminal device and to inform the terminal device regarding an updated configuration of an at least one radio bearer associated with the multiple point transmission system. The at least one secondary point is configured to communicate with the terminal device and at least one of the at least one secondary point is capable of scheduling downlink data transmission to the terminal device individually. The multiple point transmission system further includes a controller. The controller is configured to reconfigure the multiple point transmission system according to the updated configuration of the at least one radio bearer.

An advantage of an embodiment of the present invention is enabling an efficient multiple point transmission between a plurality of wireless points and a terminal device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for managing radio bearers in a multiple point transmission system. Furthermore, the invention may also be applied to a variety of communication systems.

Figure 1:
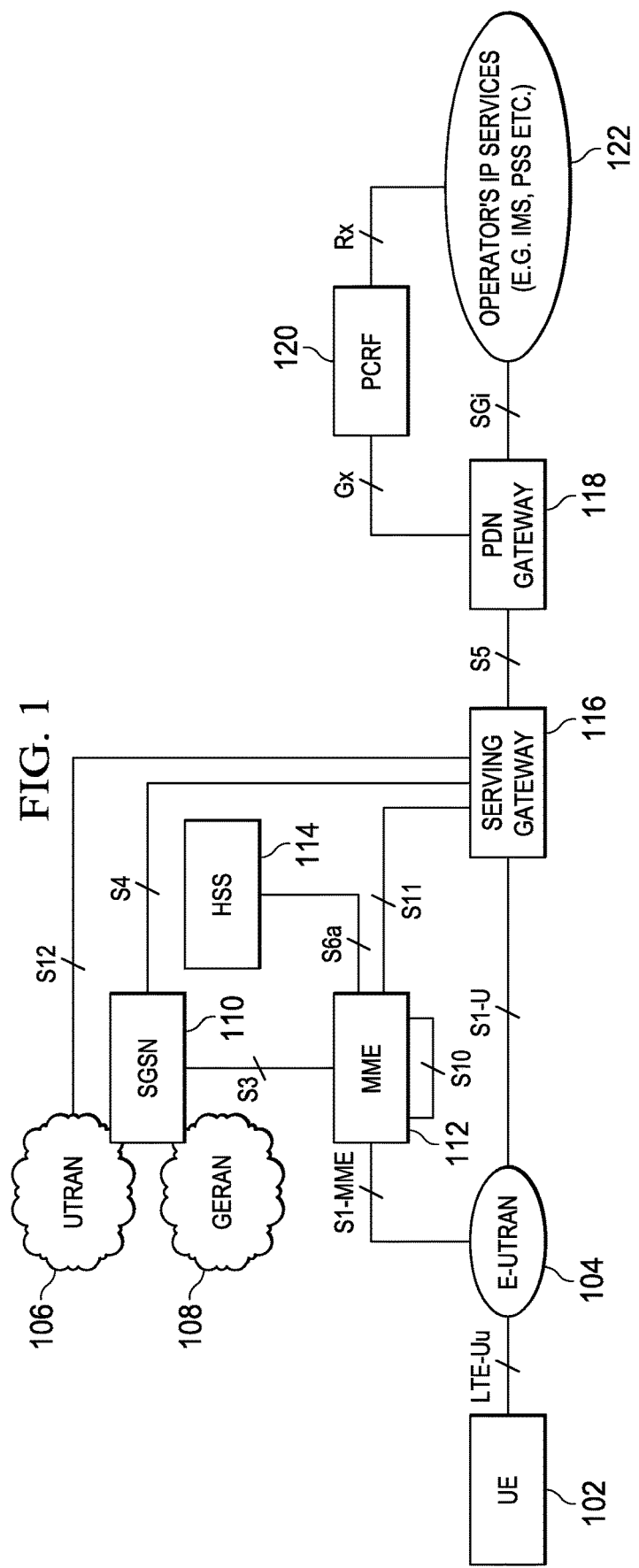
FIG. 1 illustrates a data path in a LTE wireless network in accordance with an embodiment.

Referring initially to FIG. 1, a data path in a LTE wireless network is illustrated in accordance with an embodiment. The wireless network may include a wireless user equipment (UE) 102 and an IP network 122. The UE device 102 communicates with the IP network 122 through a data path formed by a plurality of functional elements such as Enhanced UMTS Radio Access Network (E-UTRAN), Serving Gateway, Packet Data Network (PDN) Gateway and the like. The wireless network may further comprise other functional elements such as a Mobility Management Entity (MME) node 112. The MME is capable of authenticating a user through a home subscriber system (HSS) 114.

The UE device 102 may be a notebook computer, a mobile phone or a Personal Digital Assistant (PDA), a media player, a gaming device or the like. The E-UTRAN 104 may comprise a plurality of base stations such as eNodeB in a LTE wireless system. Each base station may include a processor, a transmitter and a receiver. Furthermore, the transmitter may comprise at least one transmit antennas. The receiver may comprise at least one receive antenna. Similarly, the UE 102 may include a processor, a transmitter and a receiver. In addition, the transmitter of the UE 102 may comprise at least one transmit antenna. The receiver of the UE 102 may comprise at least one receive antenna.

The SGW 116 is employed to route and forward data packets between the UE 102 and the PDN Gateway 118. In addition, the SGW 116 functions as a mobility anchor between a LTE based wireless system and other 3GPP systems such as GSM and UMTS. PDN Gateway 118 is employed to provide an exit and entry point between the UE 102 and external data networks such as operator's IP network 122. By employing a policy and charging rule function (PCRF) device 120, PDN Gateway 118 may provide a plurality of functions for the UE 102 such as policy enforcement, data packet screening, data packet filtering, data packet interception and the like. In addition, the PDN Gateway 118 may function as a mobility anchor between a 3GPP system such as a LTE system and a non-3GPP system such as WiMAX, 3GPP2 or the like.

Figure 2:
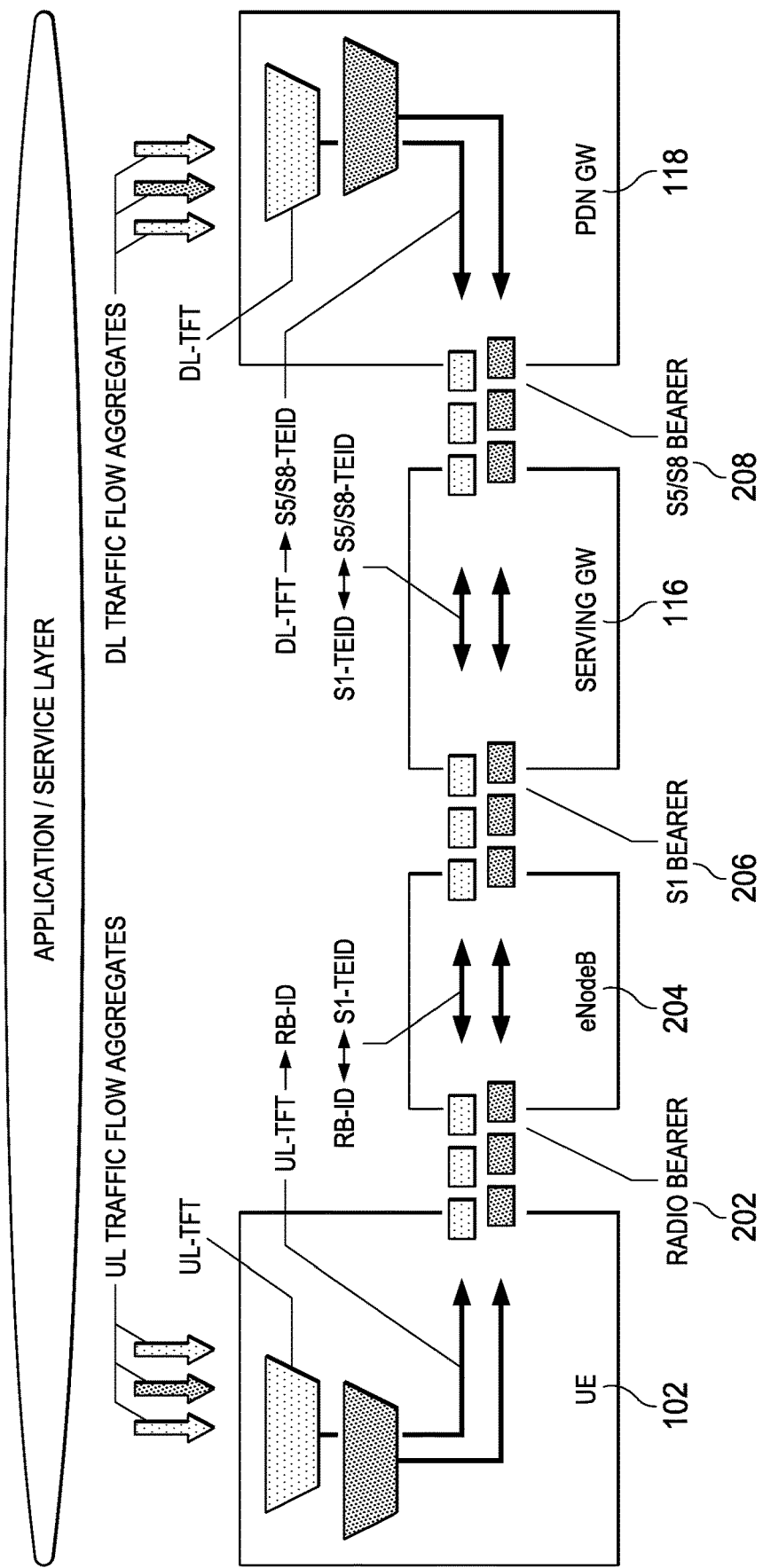
FIG. 2 illustrates a block diagram of packets transport through radio bearers in accordance with an embodiment.

FIG. 2 illustrates a block diagram of packets transport through radio bearers in accordance with an embodiment. The data transport may be implemented by using Evolved Packet System (EPS) bearers formed between the UE 102 and the PDN Gateway 118. EPS provides connectivity between a UE (e.g., UE 102) and an external data network (e.g., operator's IP network shown in FIG. 1). An EPS bearer may comprise a radio bearer, an S1 bearer and an S5/S8 bearer. As shown in FIG. 2, a radio bearer 202 carries the data transport between the UE 102 and the eNB 204. An S1 bearer 206 carries the data transport between the eNB 204 and the SGW 116. Furthermore, an S5/S8 bearer 208 carries the data transport between the SGW 116 and PDN gateway 118.

In the UE 102, UL-TFT maps an uplink traffic flow aggregate to an EPS bearer in the uplink direction. More particularly, as shown in FIG. 2, there may be a one-to-one mapping (e.g., UL-TFT→RB-ID) between an EPS bearer and a radio bearer. Likewise, in the PDN gateway 118, DL-TFT maps a traffic flow aggregate to an EPS bearer in the downlink direction. In particular, the PDN Gateway may include a one-to-one mapping (e.g., DL_TFT→S5/S8-TEID) between a downlink packet filter and an S5/S8 bearer to create the mapping between a traffic flow aggregate and an S5/S8 bearer in the downlink. Furthermore, in the eNB 204, there may be a one-to-one mapping (e.g., RB-ID↔S1-TEID) between a radio bearer (e.g., radio bearer 202) and an S1 bearer (e.g., S1 bearer 206) to create the binding between a radio bearer and an S1 bearer in both the uplink and the downlink directions. Likewise, in the SGW 116, there may be a one-to-one mapping (e.g., S1-TEID↔S5/S8-TEID) between an S5/S8 bearer and an S1 bearer to create the binding between an S5/S8 bearer and an S1 bearer in both the uplink and the downlink directions.

Figure 3:
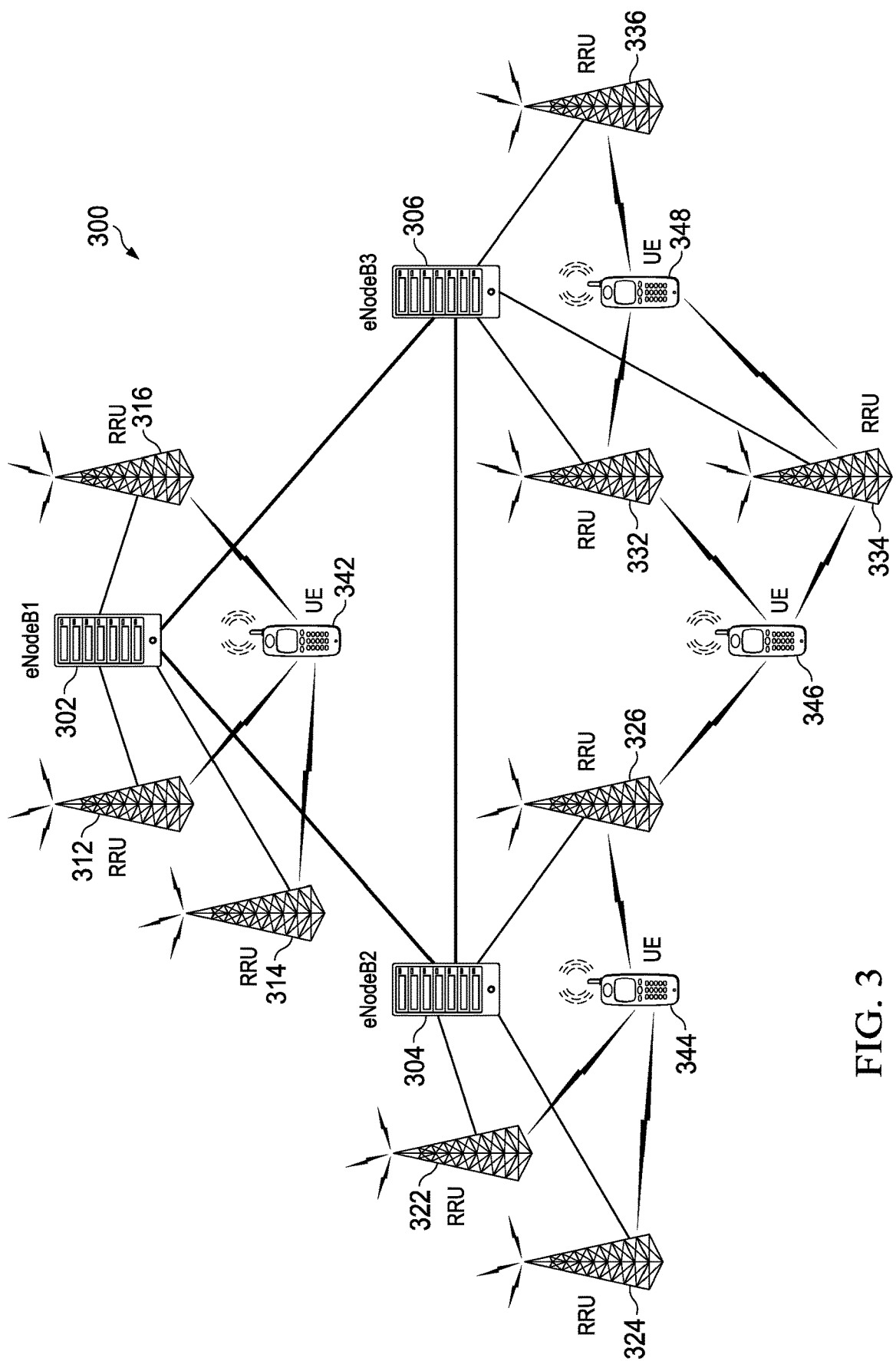
FIG. 3 illustrates a plurality of coordinated multiple point transmission (CoMP) communication systems in accordance with an embodiment.

FIG. 3 illustrates a plurality of coordinated multiple point transmission (CoMP) communication systems in accordance with an embodiment. The CoMP Communication systems 300 may comprise a plurality of eNBs (e.g., eNB 302, eNB 304 and eNB 306) and a plurality of remote radio units (RRU) such as RRU 312, RRU 314, RRU 316, RRU 422, RRU 324, RRU 326, RRU 332, RRU 334 and RRU 336. Communication systems 300 may further include a plurality of UEs (e.g., UE 342, UE 344, UE 346 and UE 348). The UEs may be served by one or multiple eNBs. Alternatively, the UE may be served by one or more RRUs. Furthermore, the UE may be served by a combination of eNBs and RRUs. A CoMP communication system comprises one UE and multiple transmission points, wherein a transmission point may be an eNB, a part of an eNB, a RRU and the like.

For example, UE 342 may be served by RRU 312, RRU 314 and RRU 316. As a result, UE 342, RRU 312, RRU 314 and RRU 316 form a first CoMP communication system. On the other hand, UE 344 may be served by RRU 322, RRU 324 and RRU 326. Similarly, UE 344, RRU 322, RRU 324 and RRU 326 form a second CoMP communication system. As shown in FIG. 3, UE 346 may be served by RRUs (e.g., RRU 326 and RRU 332) controlled by different eNBs (e.g., eNB 304 and eNB 306). More particularly, eNB 304 controls RRU 326 and eNB 306 controls both RRU 332 and RRU 334. In addition, RRU 336, RRU 332 and RRU 334 serve the UE 348. RRU 336, RRU 332, RRU 334 and UE 348 form a third CoMP communication system.

There may be a plurality of transmission points within a CoMP system. In accordance with an embodiment, a transmission point may be referred to as a primary point. The remaining transmission points may be referred to as secondary points. The primary transmission point may be considered to be a controlling transmission point for a UE, responsible for exchanging control signal messages (e.g., radio resource control messages) with the UE.

It should be noted that while FIG. 3 uses eNBs as communications controllers. Other types of communications controllers may be used in place of or in conjunction with eNBs. For example, Base Stations, Low Power Nodes, femto cells, pico cells and the like, may be used as replacements of or in conjunction with eNBs. Therefore, the discussion of eNBs should not be construed as being limiting to either the scope or the spirit of the example embodiments.

Furthermore, the discussion presented herein focuses on CoMP transmission. However, the example embodiments presented here are also operable with a more general form of CoMP transmission, i.e., multiple point transmission. Therefore, the discussion of CoMP transmission should not be construed as being limiting to either the scope or the spirit of the example embodiments.

Figure 4:
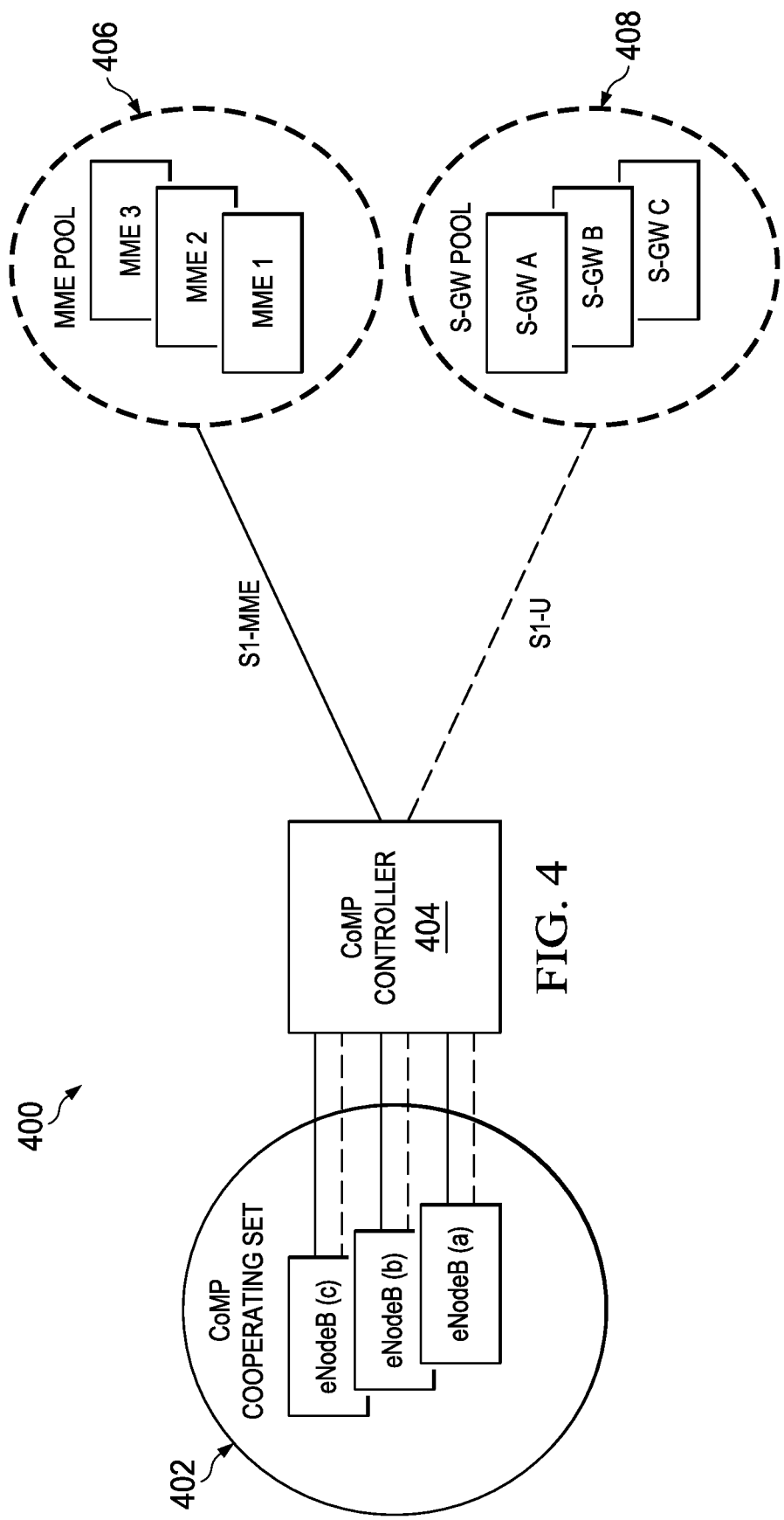
FIGS. 4 illustrates an example logical view of a communication system comprising a CoMP cooperating set and a CoMP controller in accordance with an embodiment.

FIG. 4 illustrates an example logical view of a communication system 400 comprising a CoMP cooperating set and a CoMP controller in accordance with an embodiment. The communication system 400 may comprises a CoMP cooperating set 402, a CoMP controller 404, an MME pool 406 and a SGW pool 408. The CoMP cooperating set 402 may further comprise a plurality of eNBs. As shown in FIG. 4, a CoMP controller 404 may be viewed as a centralized control unit of the CoMP cooperating set 402. CoMP controller 404 may provide a unified control for setting up, configuring CoMP transmissions for radio bearers, coordinating the operation of multiple transmission points with CoMP cooperating set 402 and so on. CoMP controller 404 may be realized as a separate physical entity connecting all (existing as well as potential) transmission points of CoMP cooperating set 402. Alternatively, CoMP controller 404 may be a logical function co-located within an existing network entity (e.g., one of eNBs or one of MMEs). It should be noted that the CoMP controller can be implemented in hardware, software, firmware and any combination thereof. It should further be noted that if the CoMP controller is implemented in software, the software can be stored on computer-readable media.

The mobility management entity (MME) pool 406 may be responsible for providing MMEs that may be used for radio bearer activation and/or deactivation, as well as UE tracking and paging procedures. MME pool 406 may include a plurality of MMEs that may be assigned to a CoMP controller (e.g., CoMP controller 404) or an eNB when the CoMP controller or the eNB has a need for radio bearer management, and so on. Assigned MMEs may be released once they are no longer needed.

The serving gateway (SGW) pool 408 may be responsible for providing SGWs that may be used as point of entry and/or exit for traffic to or from a UE. SGW pool 408 may include a plurality of SGWs that may be assigned when needed and released when no longer needed.

The communication system 400 may comprise a plurality of logic interfaces between the CoMP controller 404 and the MME pool 406 as well as the SGW pool 408. As shown in FIG. 4, there may be a plurality of S1-MME logical interfaces between CoMP controller 404 and the MME pool 406. Likewise, there may be a plurality of S1-U logic interfaces between CoMP controller 404 and the SGW pool 408.

Figure 5:
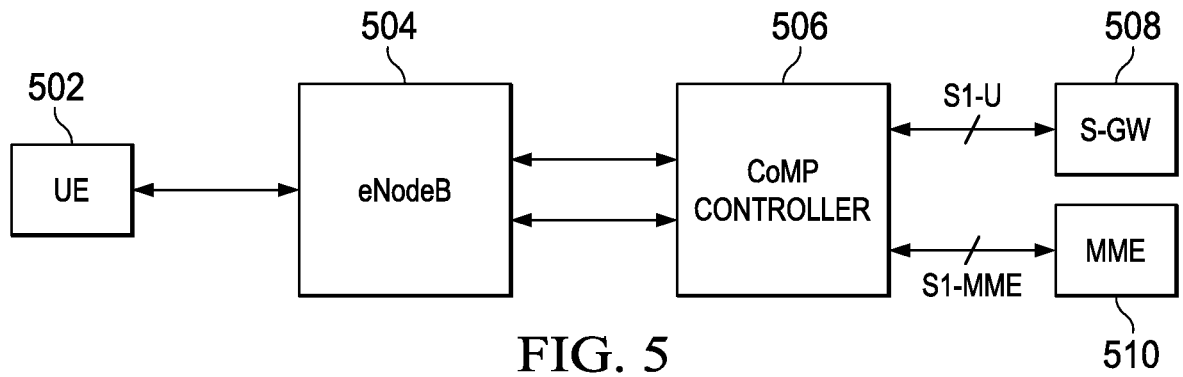
FIG. 5 illustrates a logical UE connection to Serving Gateway (SGW) and Mobility Management Entity (MME) through a CoMP controller using S1-U and S1-MME interfaces in accordance with an embodiment.

FIG. 5 illustrates a block diagram of a logical UE connection to SGW and MME through a CoMP controller using S1-U and S1-MME interfaces in accordance with an embodiment. As shown in FIG. 5, a UE 502 is wirelessly coupled to an eNB 504. The eNB may be coupled to SGW 508 and MME 510 through a CoMP controller 506. The CoMP controller 506 provides data exchange between the eNB 504 and SGW 508.

Figure 6:
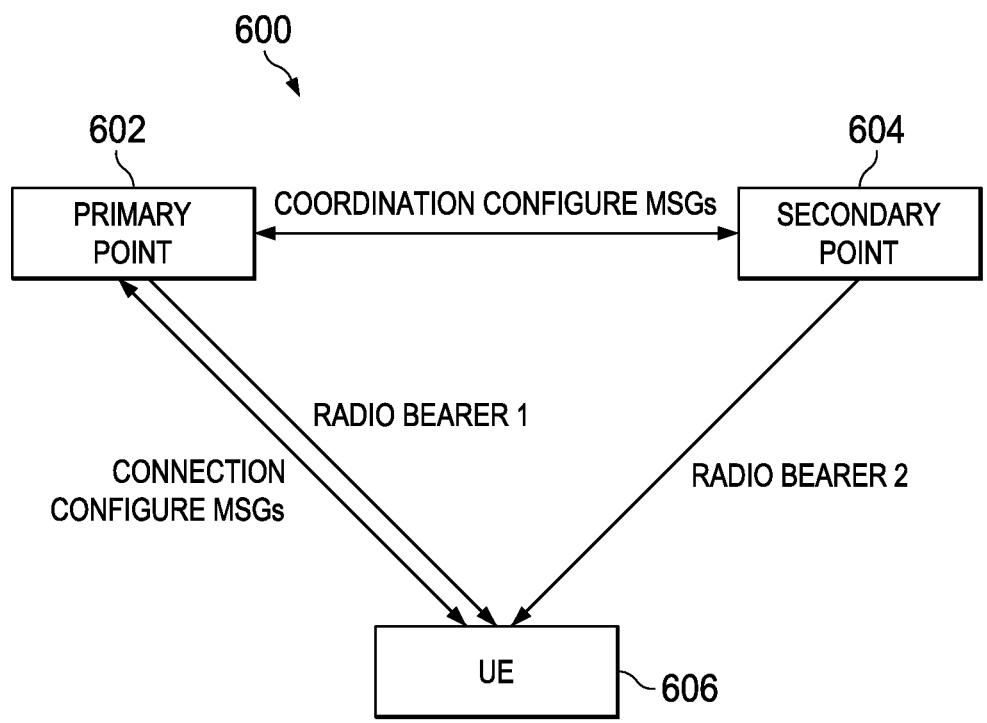
FIG. 6 illustrates an example of configuring radio bearers over multiple transmission points in accordance with an embodiment.

FIG. 6 illustrates an example of configuring radio bearers over multiple point transmission system in accordance with an embodiment. The multiple point communication system 600 may comprise a primary point 602, a secondary point 604 and a UE 606. The primary point 602 is a point from which UE 606 receives specific control signaling messages including its paging and/or radio bearer configuration. The other points in a CoMP cooperating set are referred to as secondary points (e.g., secondary point 604), which contribute to the data transmission from the network entities to the UE 606. Under a specific multiple point transmission configuration, usually, both the primary point 602 and the serving secondary point in the transmission, such as the secondary point 604, may exchange data with the UE 606 through distinct radio bearers.

As shown in FIG. 6, there may be a message exchange path between the primary point 602 and the UE 606. In addition, there may be a message exchange path between the primary point 602 and the secondary point 604. After primary point 602 and UE 606 may exchange messages such as the channel information of the UE 606, the primary point 602 may exchange the connection configuration messages between the UE 606 and the primary point 602 to inform UE 606 of changes to its radio bearer configuration and/or CoMP cooperating set. Furthermore, primary point 602 and secondary point 604 may exchange coordination configuration messages directly or indirectly (e.g., through a CoMP controller). For example, the messages exchanged between the primary point 602 and the secondary point 604 may include adding or removing a radio bearer from one point. As an example shown in FIG. 6, radio bearer 1 is set up between the UE and the primary point and radio bearer 2 is set up between the UE and the secondary point. Both primary point 602 and secondary point 604 may transmit data to UE 606 over radio bearer 1 and radio bearer 2 respectively. The detailed operation of the CoMP controller will be described below with respect to FIG. 7.

Figure 7:
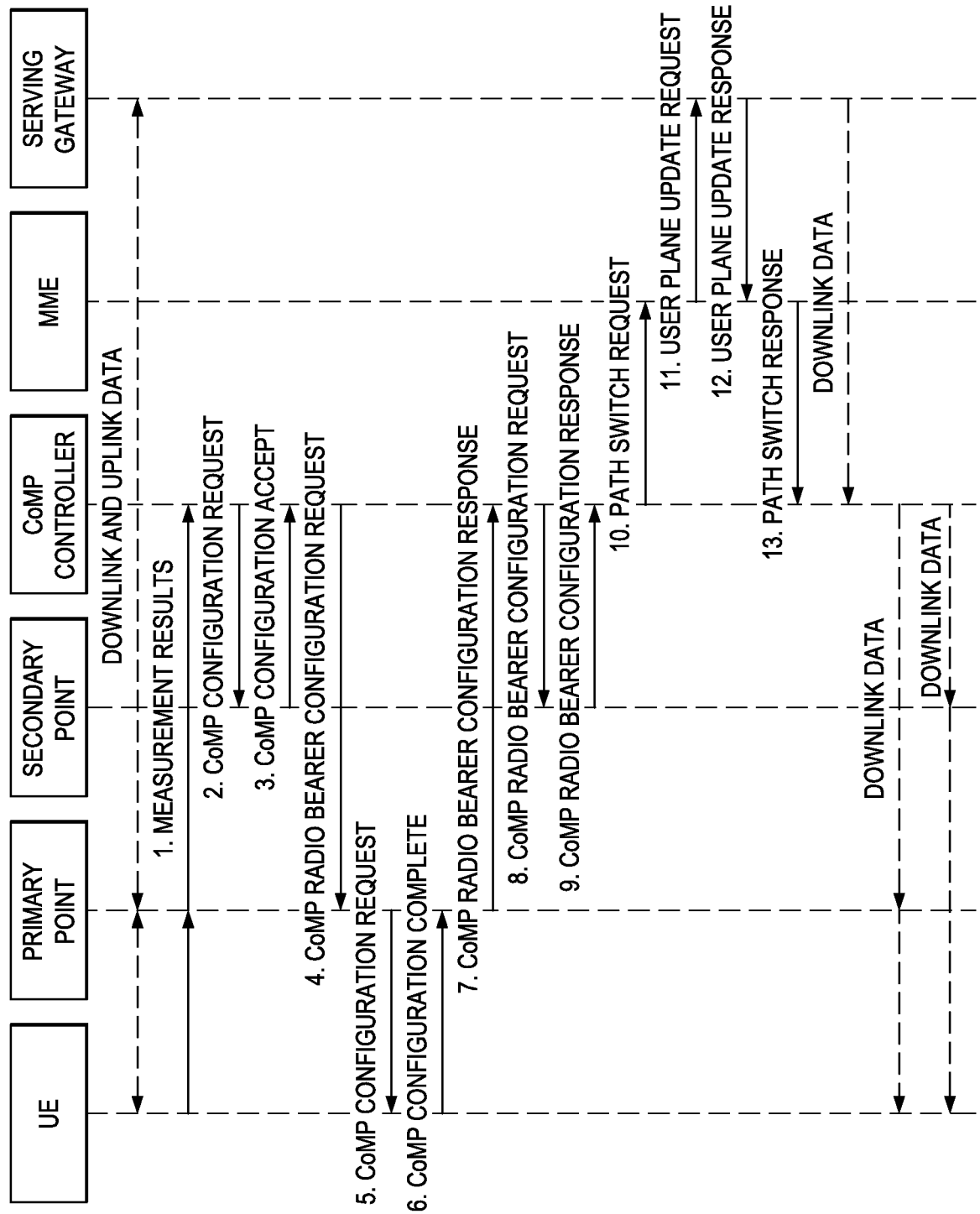
FIG. 7 illustrates the signaling flow of a method for managing radio bearers in a CoMP system in accordance with an embodiment.

FIG. 7 illustrates the signaling flow of a method for managing radio bearers in a CoMP system in accordance with an embodiment. The method comprises updating a configuration of an at least one radio bearer, i.e., one or more radio bearers, between multiple transmission points and a terminal device to form an updated configuration based upon operating condition information of the terminal device, reconfiguring the multiple point transmission system to form a reconfigured multiple point transmission system based upon the updated configuration of the at least one radio bearer and sending data to the terminal device using the reconfigured multiple point transmission system. As shown in FIG. 7, the method may include the following steps:

Step 1: a UE reports channel information of nearby points to the primary point of the UE. Channel information may include information such as Reference Signal Received Power (RSRP) and the like. The RSRP may be an indication of the channel condition between a point and the UE.

The measured channel information may be sent to a network entity. In accordance with an embodiment, the network entity may be a CoMP Controller coupled to the primary point. In various embodiments of the invention, the CoMP Controller may be located in the primary point, a mobility management entity node, or other network entity. Based upon the measured channel information and desired Quality of Service (QoS) and data delivery characteristics of the data traffic, the CoMP Controller determines the appropriate setting of one or more radio bearers in a CoMP transmission, including the points to carry the radio bearer and the QoS and/or Radio Resource Management (RRM) parameters of radio bearers from the involved points.

Step 2: If measured channel information leads to a decision that there may be a change of the CoMP configuration of the UE, the CoMP controller may update the CoMP transmission system configuration. In accordance with an embodiment of the invention, the update may include one or more of:

1) Adding a point into the CoMP transmission;
2) Removing a point from the CoMP transmission;
3) Adding a radio bearer to a transmission point; and
4) Removing a radio bearer from a transmission point.

In various embodiments of the invention, the CoMP controller may add a new radio bearer to or remove an existing radio bearer from a secondary point. The CoMP controller may also add a new secondary point into the CoMP transmission operation and add a radio bearer to the new secondary point, or remove radio bearers from an existing secondary point and remove the secondary point from the CoMP transmission operation. The CoMP controller may also move a radio bearer between two transmission points, e.g., between the primary point and a new or existing secondary point, or between two secondary points (new or existing). The moving of a radio bearer may be done by removing the radio bearer associated with an EPS bearer from the old transmission point, and adding a radio bearer associated with the same EPS bearer to the new transmission point. Note that the radio bearer at the old transmission point and the radio bearer at the new transmission point may or may not share the same radio bearer identity, but both radio bearers are associated with the same EPS bearer. It should be noted that usually adding a radio bearer to a new transmission point is taken place before removing a radio bearer from an existing transmission point. However, in some embodiment, it is also possible to remove a radio bearer from an existing transmission point first and then to add a radio bearer to a new transmission point.

After determining the type of the CoMP transmission configuration, the CoMP controller may either establish configurations for a subset of the at least one radio bearer as new radio bearers or modify existing configurations for a subset of the at least one radio bearer. Furthermore, a person skilled in the art will recognize that alternatively, the CoMP controller may generate a new configuration by establishing configurations for a subset of the at least one radio bearer as new radio bearers, modifying existing configurations for a subset of the at least one radio bearer, or a combination thereof.

The CoMP Controller may send a CoMP Configuration Request message to the involved points. The CoMP configuration request message may include the requested QoS/

RRM parameters in correspondence with the type of the CoMP transmission configuration determined by the CoMP controller. In an embodiment of the invention, the set of parameters, such as the requested QoS/RRM parameters, may include only one parameter or more parameters. For example, only a QoS parameter is included in the CoMP Configuration Request message, or a RRM parameter is included in the CoMP Configuration Request message, or only a set of QoS parameters is included in the CoMP Configuration Request message, or only a set of RRM parameters is included in the CoMP Configuration Request message, or a set of mixed QoS and RRM parameters is included in the CoMP Configuration Request message. It can be understood that different involved points may have different types of transmission configurations. The different types of transmission configuration may be reflected by, for example, different priority levels of QoS and/or different set of RRM parameters. In accordance with an embodiment of invention, the procedure of determining the CoMP transmission configuration and sending a CoMP Configuration Request message to different involved points may be separate. For example, CoMP controller may send a first CoMP Configuration Request message to a first involved point/points once the configuration is determined for the first involved point/points while determining the CoMP transmission configurations for other involved point or points. In various embodiments of the invention, the involved points may be primary point and/or secondary point/points. In a specific example embodiment as shown in FIG. 7, the involved points may be the secondary point. It should be noted that the specific embodiment as shown in FIG. 7 is merely illustrative of a specific way to make and use the invention, and do not limit the scope of the invention.

Step 3: The involved point, e.g., the secondary point in FIG. 7, receives the requested QoS/RRM parameters from the CoMP controller. In an example embodiment of the invention, there may be already radio bearer(s) existing between the secondary point and the UE or may not at this stage. If the requested QoS/RRM parameters are acceptable, the secondary point may respond with a CoMP Configuration Accept message. In an example embodiment of the invention, the involved point, e.g., the secondary point in FIG. 7, may verify the availability of its resource to determine whether the received parameters are acceptable. In another embodiment of the invention, the secondary point may make the received parameters as lowest requirement and provide better service than the received parameters requested, and determine that the received parameters are acceptable. For example, the secondary point may establish/reconfigure radio bearer with higher priority levels of QoS and/or more efficient RRM parameter, and respond with a CoMP Configuration Accept message.

Step 4: After receiving the CoMP Configuration Accept message from the secondary point, the CoMP Controller then instructs the primary point by using a CoMP Radio Bearer Configuration Request message. The CoMP Radio Bearer Configuration Request message includes the information of the radio bearers to be reconfigured. In an example embodiment of the invention, the CoMP Radio Bearer Configuration Request message may include:

1) The identities of the radio bearers associated with the CoMP reconfiguration;
2) The identities of the associated EPS bearers;
3) The identities of the points to carry this radio bearers (e.g., the radio bearers on the primary point or on the secondary point); and
4) The configuration of how this radio bearer should be transmitted on the involved point. It should be noted that in some embodiments, for example, when the configuration does not need to be changed or the radio bearer is configured to be removed, the configuration information may not necessarily be included in the message.

Step 5: The primary point sends a CoMP Configuration Request message to instruct the UE the change of the CoMP transmission. The CoMP Configuration Request message may include the identities of the involved points, radio bearers and EPS bearers. The CoMP Configuration Request message may further include the associated radio bearer configuration parameters and some specific security parameters such as Next hop Chaining Counter (NCC).

Step 6: From the received CoMP Configuration Request message, the UE knows the configuration change of the data packet transmission. More particularly, for example, in accordance with a set of specified radio bearer configuration parameters, the UE knows that data packets of the indicated EPS bearer will be transported on the indicated radio bearer from the involved point (e.g., a secondary point newly added into the multiple point transmission system) using the specified radio bearer configuration parameters. Furthermore, the UE also uses the received security parameters such as NCC to derive a security key for the user plane encryption. After getting ready to receive data from the new CoMP transmission, the UE responds to the primary point positively with a CoMP Configuration Complete message.

Step 7: After receiving positive acknowledgement from the UE, the primary point also responds positively to the CoMP Controller with a CoMP Radio Bearer Configuration Response message. The CoMP Radio Bearer Configuration Response message may include a security key $K_{eNB}^*$ for the secondary point. The security key $K_{eNB}^*$ of a secondary point is derived based on the security parameter NCC, a UE related security parameter Next Hop (NH) and the information related to the secondary point's identity. It should be noted that the security parameter NCC is the same as the one sent to UE in Step 5.

Step 8: The CoMP Controller sends a CoMP Radio Bearer Configuration Request message to the secondary point. The CoMP Radio Bearer Configuration Request message contains the information of the required RRM/QoS parameters for a subset of an at least one radio bearers to be transmitted by the secondary point and the security key $K_{eNB}^*$ of the secondary point. Furthermore, the CoMP Radio Bearer Configuration Request message sent to the secondary point may comprise other configuration parameters of the subset of an at least one radio bearer to be transmitted by the secondary point. The secondary point uses the received $K_{eNB}^*$ directly to derive an encryption key $K_{UP\text{-}enc}$ for the involved radio bearers.

Step 9: After storing the received parameters and configuring the radio bearers successfully, the secondary point responds positively to the CoMP Controller with a CoMP Radio Bearer Configuration Response message.

Step 10: The CoMP Controller sends a Path Switch Request message to MME to inform that a CoMP transmission is established for the involved UE, hence its data packets should now be sent to the CoMP Controller.

Step 11: The MME sends a User Plane Update Request message to the Serving Gateway containing the address of the CoMP Controller.

Step 12: The Serving Gateway starts sending data packets of the involved UE to the CoMP Controller using the newly received address. A User Plane Update Response message is sent back to the MME.

Step 13: The MME confirms the Path Switch Request message with the Path Switch Response message.

After the radio bearer management process described above, the CoMP controller distributes data packets of EPS bearers to the primary point and the secondary point respectively. As shown in FIG. 7, the downlink data may be sent from SGW to the CoMP controller first. Because the process described above has already added the secondary point into the CoMP transmission, the CoMP controller distributes the downlink data to both the primary point and the secondary point based on the radio bearers handled by each point respectively. Subsequently, data packets are sent from multiple points (e.g., primary point and secondary point) to the UE.

Figure 8:
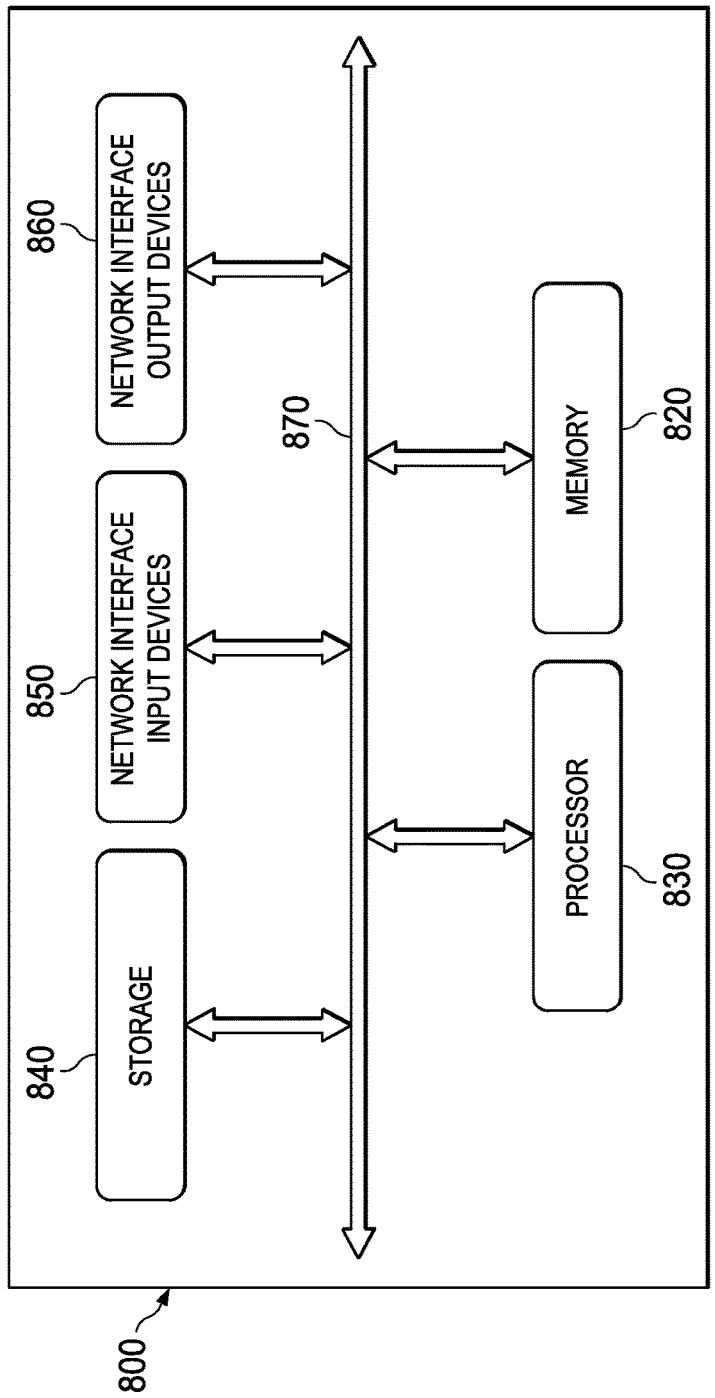
FIG. 8 illustrates a simplified block diagram of a CoMP controller that can be used to implement the radio bearer management method in accordance with an embodiment.

FIG. 8 illustrates a simplified block diagram of a CoMP controller 800 that can be used to implement the radio bearer management method in accordance with an embodiment. The CoMP controller 800 includes a memory 820, a processor 830, a storage unit 840, network interface input devices 850, network interface output devices 860 and a data bus 870. It should be noted that this diagram is merely an example of a controller, which should not unduly limit the scope of the claims. Many other configurations of a controller are within the scope of this disclosure.

The CoMP controller 800 may be a physical device, a software program, or a combination of software and hardware such as an Application Specific Integrated Circuit (ASIC). In accordance with an embodiment, when the computer receives a media file through the network interface input devices 850, the processor 830 loads the media file into the storage unit 840. According to an embodiment where the advanced media preview method is implemented as a software program, the process 830 loads the software program from the storage unit 840 and operates it in the memory 820. When the processor 830 performs the steps of FIG. 7, the processor 830 sends the radio bearer management information to other network entities through a network interface output devices 860. It should be noted that the controller 800 may be located at the primary point. In addition, if the controller 800 is embedded in the primary point, some steps of FIG. 7 (e.g., steps 4-7) may be omitted. Alternatively, the controller 800 may be located at the secondary point. Furthermore, the controller 800 may be located at other network entities such as MME or SGW. Moreover, one skilled in the art will recognize that the controller 800 may be a standalone entity wirelessly coupled to other entities of a wireless communication system.

In an example embodiment of the invention, the controller is configured to send the downlink data of a first radio bearer to the primary point; and send the downlink data of a second radio bearer to one or more first secondary points. The one or more first secondary points are capable of scheduling downlink data transmission to the terminal device individually. The terminal device is configured to receive the downlink data of the first radio bearer from the primary point, and to receive the downlink data of the second radio bearer from the one or more first secondary points.

Figure 9:
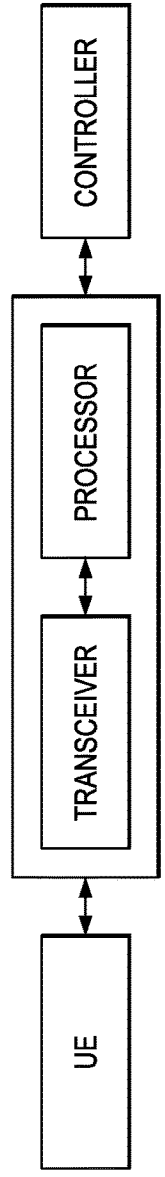
FIG. 9 illustrates a simplified block diagram of a primary point in communicating with a CoMP controller and a UE in accordance with an embodiment.

As shown in FIG. 9, in accordance with an example embodiment of the invention, the primary point in the multiple point transmission system includes a processor to determine that a reconfiguration is required for the multiple point transmission system. The processor generates a CoMP Configuration Request message and sends the message through a transceiver to a UE. The CoMP Configuration Request message may include the identities of the involved points, radio bearers and EPS bearers. The CoMP Configuration Request message may further include the associated radio bearer configuration parameters and some specific security parameters such as Next hop Chaining Counter (NCC).

Although embodiments of the present invention and its advantages have been described in detail, it should be understood that various changes, substitutions and alterations can be made herein without departing from the spirit and scope of the invention as defined by the appended claims. It should also be understood that in some example embodiments, numbered steps are used just to facilitate the description and the step numbers do not suggest an order or procedural steps.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a user equipment (UE) in a cellular multi-point communication mode with a cellular radio access network, the method comprising:

exchanging, by the UE with a first communication point in the cellular radio access network, data over a first bearer between the first communication point and the UE;

receiving, by the UE from the first communication point, a message comprising at least one security parameter for a security key and information related to an identity of a second communications point in the cellular radio access network or a second bearer; and exchanging, by the UE with the second communication point, data over the second bearer between the second communication point and the UE in accordance with the security key and the information related to the identity of the second communications point or the second bearer, the security key derived in accordance with the at least one security parameter, wherein the UE simultaneously exchanges the data over the first bearer with the first communication point and the data over the second bearer with the second communication point while the UE is operating in the cellular multi-point communication mode in the cellular radio access network.

2. The method of claim 1, further comprising:

receiving, by the UE from the first communication point, configuration information associated with the second bearer.

3. The method of claim 2, wherein the configuration information associated with the second bearer comprises one or more of:

identification information of the second communication point;

identification information of the second bearer;

identification information of a radio bearer associated with the second bearer;
identification information of an enhanced packet system (EPS) bearer associated with the second bearer;
configuration parameters of the second bearer; and
a security parameter.

4. The method of claim 3, wherein the configuration parameters of the second bearer comprise Quality of Service (QoS) parameters of the second bearer.

5. The method of claim 2, further comprising:
removing the second bearer between the UE and the second communication point according to the configuration information associated with the second bearer.

6. The method of claim 2, further comprising:
reconfiguring the second bearer according to the configuration information associated with the second bearer.

7. The method of claim 1, further comprising:
receiving, by the UE from the first communication point, configuration information associated with the second bearer, for setting up the second bearer between the second communication point and the UE.

8. The method of claim 1, wherein at least one of the first bearer and the second bearer is an enhanced packet system (EPS) bearer.

9. The method of claim 1, wherein at least one of the first bearer and the second bearer is an Evolved Universal Terrestrial Radio Access Network (E-UTRAN) Radio Access Bearer (E_RAB).

10. A method of operating a first communication point in a multiple point communication system, the method comprising:
exchanging, by the first communication point with a user equipment (UE) configured to operate in a multi-point communication mode, data over a first bearer between the first communication point and the UE;
sending, by the first communication point to a second communication point, configuration information associated with a second bearer, the second bearer being between the second communication point and the UE, and wherein the second communication point is configured to set up the second bearer in accordance with the configuration information associated with the second bearer; and
sending, by the first communication point to the UE, a message comprising security parameters for a security key for the second communication point, the security key being derived by the second communication point based at least on a security parameter related to the UE and information related to an identity of the second communication point or the second bearer.

11. The method of claim 10, wherein the configuration information associated with the second bearer comprises one or more of:
configuration parameters of the second communication point;
identification information of the second communication point;
identification information of the second bearer;
identification information of a radio bearer associated with the second bearer;
identification information of an enhanced packet system (EPS) bearer associated with the second bearer;
configuration parameters of the second bearer; and
a security parameter.

12. The method of claim 11, wherein the configuration parameters of the second bearer comprise Quality of Service (QoS) parameters of the second bearer.

13. The method of claim 10, further comprising:
sending, by the first communication point to the UE, configuration information associated with the second bearer for setting up the second bearer between the second communication point and the UE.

14. The method of claim 10, further comprising:
removing the second bearer between the UE and the second communication point according to the configuration information associated with the second bearer.

15. The method of claim 10, further comprising:
reconfiguring the second bearer according to the configuration information associated with the second bearer.

16. The method of claim 10, wherein at least one of the first bearer and the second bearer is an enhanced packet system (EPS) bearer.

17. The method of claim 10, wherein at least one of the first bearer and the second bearer is an Evolved Universal Terrestrial Radio Access Network (E-UTRAN) Radio Access Bearer (E_RAB).

18. A user equipment (UE) configured to operate in a cellular multi-point communication mode with a cellular radio access network, the UE comprising:
a processor; and
a non-transitory computer readable storage medium storing programming for execution by the processor, the programming including instructions to:
exchange, with a first communication point in the cellular radio access network, data over a first bearer between the first communication point and the UE; and
receive, from the first communication point, a message comprising at least one security parameter for a security key and information related to an identity of a second communication point in the cellular radio access network or a second bearer; and
exchange, with the second communication point, data over the second bearer between the second communication point and the UE in accordance with the security key and the information related to the identity of the second communications point or the second bearer, the security key derived in accordance with the at least one security parameter, wherein the UE simultaneously exchanges the data of the first bearer with the first communication point and the data of the second bearer with the second communication point while the UE is operating in the cellular multi-point communication mode with the cellular radio access network.

19. The UE of claim 18, wherein the programming further includes instructions to:
receive, from the first communication point, configuration information associated with the second bearer.

20. The UE of claim 19, wherein the configuration information associated with the second bearer comprises one or more of:
identification information of the second communication point;
identification information of the second bearer;
identification information of a radio bearer associated with the second bearer;
identification information of an enhanced packet system (EPS) bearer associated with the second bearer;
configuration parameters of the second bearer; and
a security parameter.

21. The UE of claim 20, wherein the configuration parameters of the second bearer comprise Quality of Service (QoS) parameters of the second bearer.

22. The UE of claim 19, wherein the programming further includes instructions to:
remove the second bearer between the UE and the second communication point according to the configuration information associated with the second bearer.

23. The UE of claim 19, wherein the programming further includes instructions to:
reconfigure the second bearer according to the configuration information associated with the second bearer.

24. The UE of claim 18, wherein the programming further includes instructions to:
receive, from the first communication point, configuration information associated with the second bearer for setting up the second bearer between the second communication point and the UE.

25. The UE of claim 18, wherein at least one of the first bearer and the second bearer is an enhanced packet system (EPS) bearer.

26. The UE of claim 18, wherein at least one of the first bearer and the second bearer is an Evolved Universal Terrestrial Radio Access Network (E-UTRAN) Radio Access Bearer (E_RAB).

27. A first communication point in a multiple point communication system comprising:
a processor; and
a non-transitory computer readable storage medium storing programming for execution by the processor, the programming including instructions to:
exchange, with a user equipment (UE) configured to operate in a multi-point communication mode, data over a first bearer between the first communication point and the UE;
send configuration information associated with a second bearer, the second bearer being between a second communication point and the UE, and wherein the second communication point is configured to set up the second bearer in accordance with the configuration information associated with the second bearer; and
send a message comprising security parameters for a security key for the second communication point, the security key being derived by the second communication point based at least on a security parameter related to the UE and information related to an identity of the second communication point or the second bearer.

28. The first communication point of claim 27, wherein the configuration information associated with the second bearer comprises one or more of:
configuration parameters of the second communication point;
identification information of the second communication point;
identification information of the second bearer;
identification information of a radio bearer associated with the second bearer;
identification information of an enhanced packet system (EPS) bearer associated with the second bearer;
configuration parameters of the second bearer; and
a security parameter.

29. The first communication point of claim 28, wherein the configuration parameters of the second bearer comprise Quality of Service (QoS) parameters of the second bearer.

30. The first communication point of claim 27, wherein the programming further includes instructions to:
send, to the UE, configuration information associated with the second bearer for setting up the second bearer between the second communication point and the UE.

31. The first communication point of claim 27, wherein the programming further includes instructions to:
remove the second bearer between the UE and the second communication point according to the configuration information associated with the second bearer.

32. The first communication point of claim 27, wherein the programming further includes instructions to:
reconfiguring the second bearer according to the configuration information associated with the second bearer.

33. The first communication point of claim 27, wherein at least one of the first bearer and the second bearer is an enhanced packet system (EPS) bearer.

34. The first communication point of claim 27, wherein at least one of the first bearer and the second bearer is an Evolved Universal Terrestrial Radio Access Network (E-UTRAN) Radio Access Bearer (E_RAB).

* * * * *